No. 728,535. PATENTED MAY 19, 1903.
W. W. BRADY.
AGRICULTURAL IMPLEMENT.
APPLICATION FILED JAN. 2, 1903.
NO MODEL.
Figure 1.
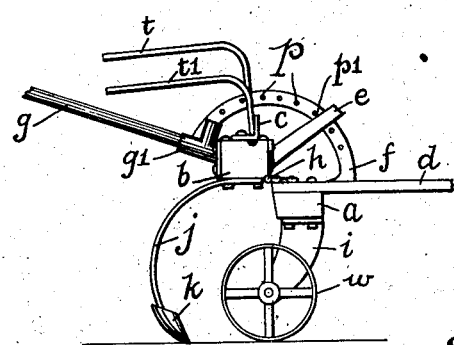
Fig. 2.
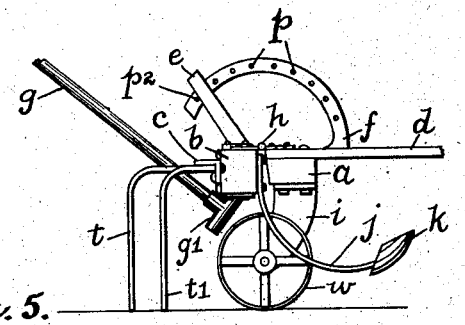
Fig. 3.
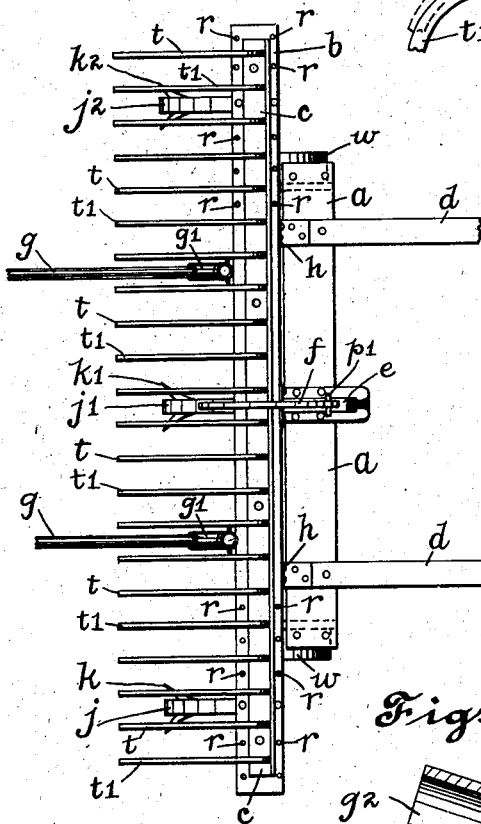
Fig. 5.
Fig. 4.
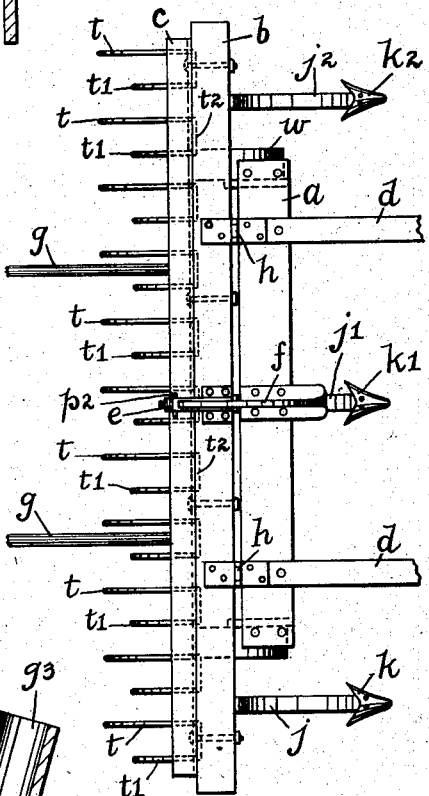
Fig. 6.
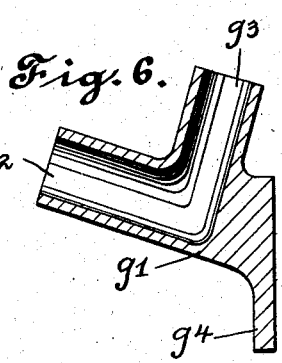
Witnesses:
Albert C. Bell.
A. Pearl Moore.
Inventor
William W. Brady
By his Atty.
W. K. Cooley.

No. 728,535. Patented May 19, 1903.

UNITED STATES PATENT OFFICE.

WILLIAM W. BRADY, OF ROCHESTER, NEW YORK, ASSIGNOR TO THOMAS P. KELLY, TRUSTEE, OF NEW YORK, N. Y.

AGRICULTURAL IMPLEMENT.

SPECIFICATION forming part of Letters Patent No. 728,535, dated May 19, 1903.

Application filed January 2, 1903. Serial No. 137,608. (No model.)

*To all whom it may concern:*

Be it known that I, WILLIAM W. BRADY, a citizen of the United States, residing at Rochester, in the county of Monroe and State of New York, have invented a new and Improved Agricultural Implement, of which the following is a specification.

This invention relates to that class of agricultural implements designed to be used interchangeably as weeders or markers, the object of the invention being to provide a machine which shall combine in a single construction the essential features of a weeder or a marker, with such features so arranged as to render the machine readily interchangeable in its use.

For this purpose the invention consists of such features of construction as are calculated to add to the efficiency of the machine for either purpose, while at the same time resulting in the lessening of the cost of production of such a combined machine.

The accompanying drawings illustrate a combined weeder and marker embodying my invention, the several views of which are as follows:

Figure 1 is an end view of the machine with the parts in position to operate as a landmarker. Fig. 2 is a view similar to Fig. 1 with the parts in position to operate as a weeder. Figs. 3 and 4 are top views of the parts shown in Figs. 1 and 2, respectively. Fig. 5 is an enlarged detail sectional view showing the method of supporting the weeder-teeth, and Fig. 6 is a detail sectional view of one of the handle-sockets $g'$.

As seen in Figs. 1, 2, 3, and 4, the machine consists of a main cross-piece $a$, supported at each end by a bracket $i$ from a wheel $w$, and to such cross-piece $a$ the thills $d$ $d$ are rigidly secured. A second cross-piece $b$, hinged to the thills $d$ $d$ at $h$ $h$, has rigidly secured to its under face, as seen in Figs. 1 and 3, or its forward face, as seen in Figs 2 and 4, a series of curved arms $j$ $j'$ $j^2$, carrying at their lower ends shoes $k$ $k'$ $k^2$, respectively, such shoes being so shaped as to mark or furrow the land in the usual way. This piece $b$ carries upon its upper face, as seen in Figs. 1 and 3, or its rear face, as seen in Figs. 2 and 4, by means of an angle-iron $c$, rigidly secured to such piece $b$, as indicated, a series of teeth $t$ $t'$, arranged in two transverse rows, one in front of the other, the teeth $t$ $t$ forming the rear row and the teeth $t'$ $t'$ forming the front row. These teeth are used for weeding purposes, and hence are comparatively numerous, while only three arms $j'$ $j'$ $j^2$ and marking-shoes $k$ $k'$ $k^2$ are usually used. More arms and shoes may be used, if desired, and those shown may be adjusted for different widths of marking by securing the arms $j$ $j^2$ to the cross-piece $b$ at different distances from the arm $j'$ by means of the holes $r$ $r$ $r$ in such piece $b$, as seen in Fig. 3.

The method of forming the teeth $t$ $t'$ and securing them in their operative position is shown in Figs. 1, 2, 4, and 5. Each tooth $t$ is connected by a cross-piece $t^3$ with an adjacent tooth $t'$ toward the observer, each of such pair of teeth $t$ $t'$ being formed of one piece of rod. The angle-iron $c$ is nearly as long as the cross-piece $b$ and has holes bored therethrough equal in number to the teeth $t$ $t'$ and a little larger in diameter than such teeth. The teeth are slipped through the holes in the angle-iron $c$, so as to occupy the relation to it indicated in the drawings, and then such angle-iron $c$ is securely bolted to the piece $b$, as indicated. A groove is cut longitudinally in the piece $b$, so as to clear and not bind the cross-sections $t^2$ $t^2$ of the teeth.

Since the holes in the angle-iron $c$ are a little larger than the teeth, they permit such teeth to have a small amount of play, as indicated in Fig. 5, for one tooth $t'$, as a result of which when in operation the upper portions of such teeth press upward against the horizontal portion of the angle-iron $c$, as shown in Fig. 2 and indicated in dotted lines in Fig. 5. Hence such angle-iron $c$ acts as a brace to stiffen and strengthen such teeth when in operation.

In order to give the piece $b$ and parts carried thereby any desired angular adjustment relatively to the piece $a$, an annular sector $f$, having a series of holes $p$ $p$ therein, is rigidly secured at or near the center of the piece $a$ on its upper face, so as to extend upward and to the rear over the piece $b$. An arm $e$, having a slot therethrough, is so secured to the forward face, as seen in Fig. 1, or the upper face, as seen in Fig. 2, of the piece $b$ that the sector $f$ passes freely through the slot in such arm $e$ and permits the arm $e$ and piece $b$ to assume different angular positions relatively to the piece $a$. Since the greater part of the weight carried by the piece $b$ is to the rear of the hinges $h\ h$ the normal tendency of the arm $e$ is to move over to the left, and hence when the parts are adjusted angularly to the position desired a pin in the hole $p$ just to the rear of the arm $e$ will keep the parts in such adjustment and prevent the teeth $t$ and $t'$ from dropping below the desired level. Such a pin is indicated at $p'$ and $p^2$ for Figs. 1 and 2, respectively.

In the event of the shoes $k\ k'\ k^2$ or teeth $t\ t'$ striking a stone or similar obstruction, however, the piece $b$ may rotate to the right far enough to clear such obstruction, since there is nothing to hinder the arm $e$ moving around to the right on the sector $f$ for any operative adjustment far enough to clear such obstruction.

Two handles $g\ g$ are provided, which fit into sockets $g'\ g'$, rigidly secured to the piece $b$, as indicated, so formed that for one operative position of the piece $b$ a handle $g$ is inserted into the opening $g^2$ of the socket $g'$, while for the other operative position such handle $g$ is inserted in the opening $g^3$ of such socket, such openings in such sockets being indicated in Fig. 6, in which view the base $g^4$, formed on such socket for securing it to the piece $b$, is also indicated.

The handles $g\ g$ operate to facilitate the adjustment of the machine, to avoid obstructions, and to clear the machine of weeds when used as a weeder. In such last connection it is to be noted that if the handles $g\ g$ are raised too far through carelessness, so that the shoes $k\ k'\ k^2$ come in contact with the ground, such shoes, owing to their conformation, will not be readily drawn into the ground, but will ride upon the surface and tend to prevent a further motion around to the right of the parts. If desired, the possible amount of right-handed rotation may be limited for any particular adjustment of the parts by placing a second pin in one of the holes $p\ p$ in advance of the arm $e$, a distance angularly equal to the desired rotation of the piece $b$ and parts carried thereby.

What I claim is—

1. In an agricultural implement in combination with an axle and its supporting-wheels, a body-piece hinged to such axle, a series of weeder-teeth secured to one side of such body-piece and a series of marker-teeth secured to another side of such body-piece, and means for securing such body-piece in either one of two operative positions, one of such series of teeth arranged to be supported free from the ground and beneath the axle when the other is in operative position.

2. In an agricultural implement in combination with an axle and its supporting-wheels, a body-piece hinged to such axle, a series of weeder-teeth secured to one side of such body-piece and a series of marker-teeth secured to another side of such body-piece, means for securing such body-piece in either one of two operative positions, one of such series of teeth arranged to be supported free from the ground and beneath the axle when the other is in operative position, and means for preventing either one of such series of teeth from entering too deeply into the ground.

3. In an agricultural implement in combination with an axle and its supporting-wheels, a body-piece hinged to such axle, a series of weeder-teeth secured to one side of such body-piece and a series of marker-teeth secured to another side of such body-piece, means for securing such body-piece in either one of two operative positions, one of such series of teeth arranged to be supported free from the ground and beneath the axle when the other is in operative position, and means for yieldably holding such body-piece in either one of such positions.

WILLIAM W. BRADY.

Witnesses:
　ALBERT C. BELL,
　A. PEARL MOORE.